May 17, 1932.   C. J. KELLEY   1,858,710
POULTRY BROODING HOUSE
Filed Sept. 14, 1929   4 Sheets-Sheet 1

Inventor
Charles J. Kelley

By Clarence A. O'Brien
Attorney

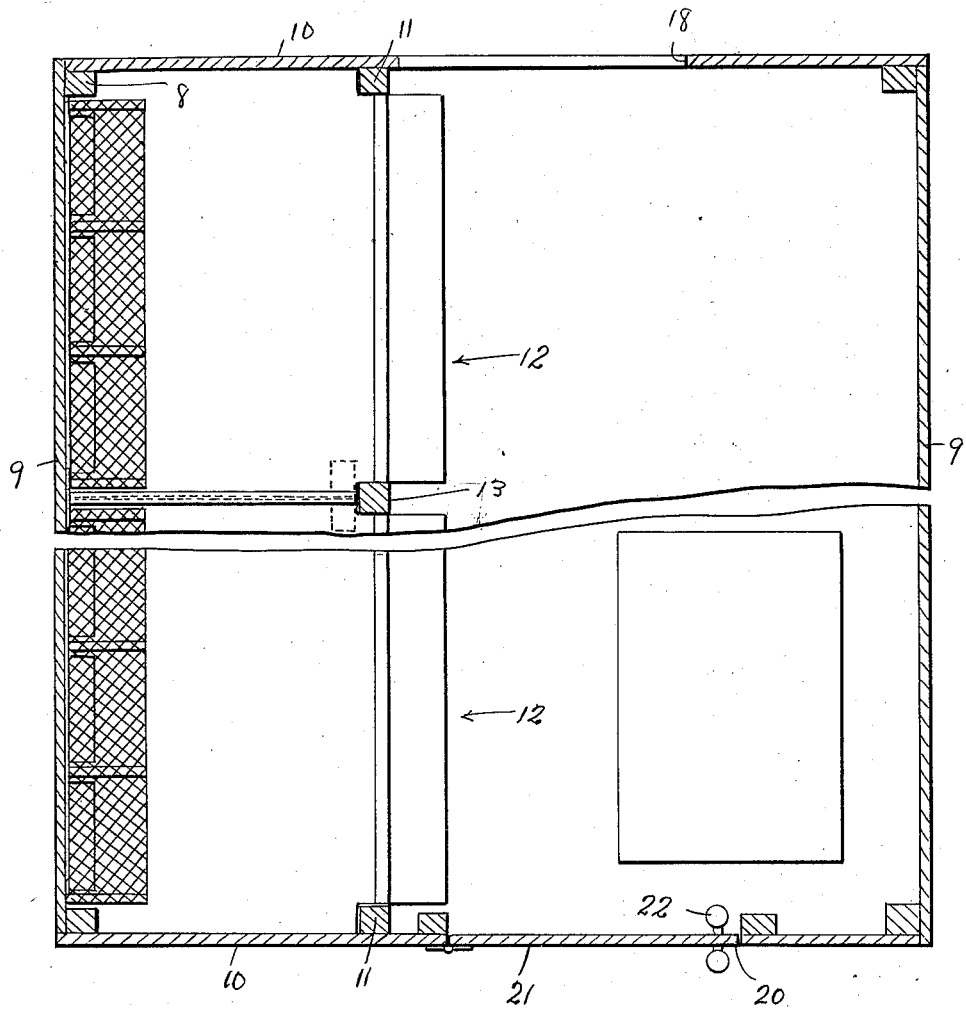
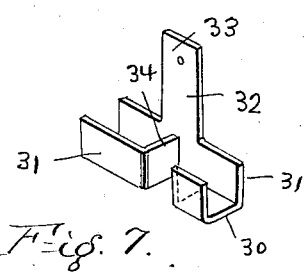

May 17, 1932. C. J. KELLEY 1,858,710
POULTRY BROODING HOUSE
Filed Sept. 14, 1929 4 Sheets-Sheet 3

Inventor
Charles J. Kelley
By Clarence A. O'Brien
Attorney

May 17, 1932.  C. J. KELLEY  1,858,710
POULTRY BROODING HOUSE
Filed Sept. 14, 1929  4 Sheets-Sheet 4

Inventor
Charles J. Kelley

By Clarence A O'Brien
Attorney

Patented May 17, 1932

1,858,710

UNITED STATES PATENT OFFICE

CHARLES J. KELLEY, OF ANSELMO, NEBRASKA

POULTRY BROODING HOUSE

Application filed September 14, 1929. Serial No. 392,635.

The present invention appertains to improvements in the art of animal husbandry and more particularly to a novel poultry brooding house. The principal object of the invention is to provide a brooding house wherein a plurality of compartments are provided for separating groups of poultry.

Another salient object of the invention is to provide a poultry brooding house having a plurality of compartments within each of which the floor is removable to facilitate the cleaning thereof.

After considering the following specification and claim, other important objects and advantages of the invention will readily become apparent.

In the drawings:

Figure 2 represents a horizontal sectional view through the house.

Figure 7 is another perspective view of one of the brackets for supporting the forward end of the floor units.

Figure 1:
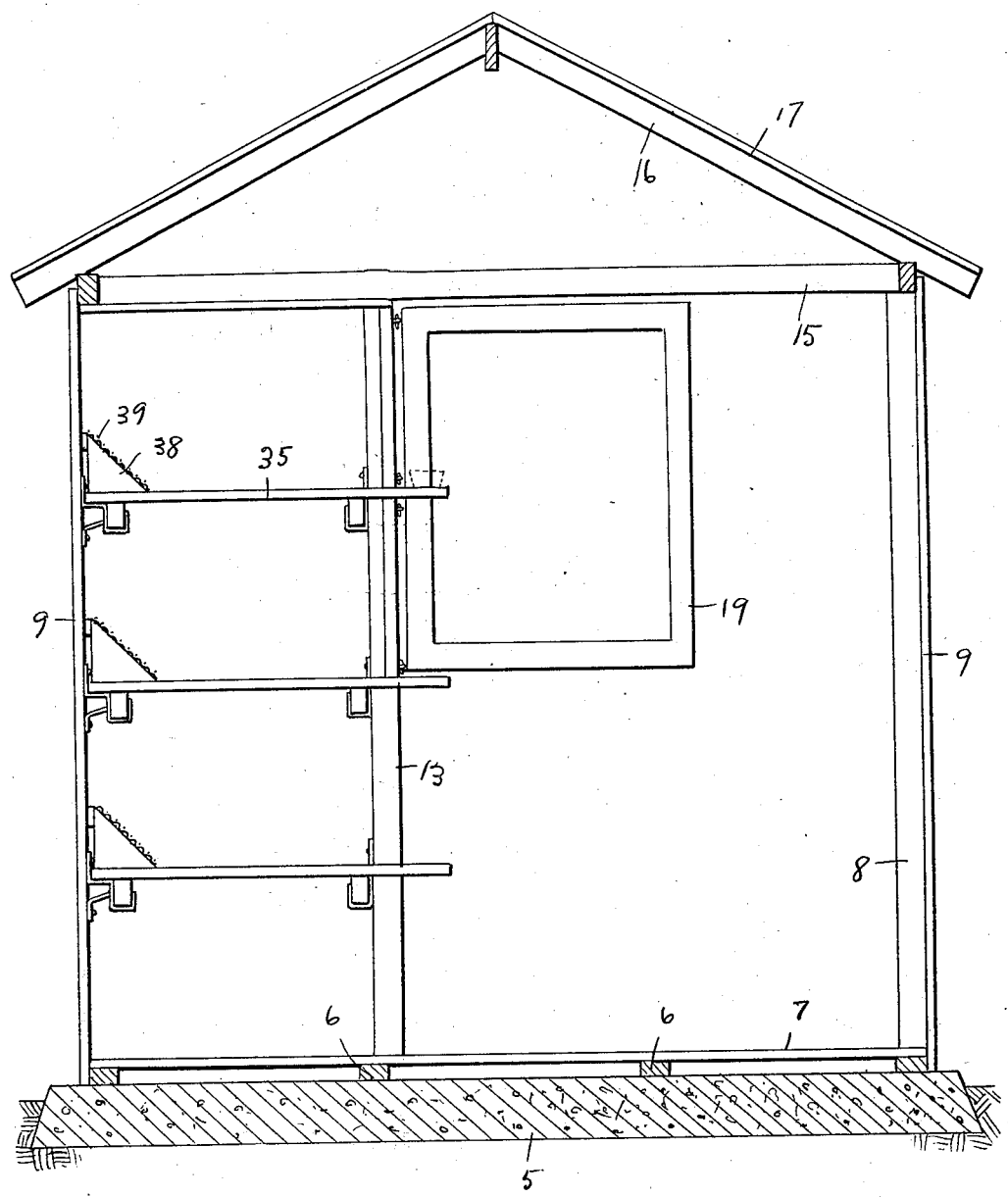
Figure 1 represents a vertical sectional view through the novel brooding house.
Figure 3:
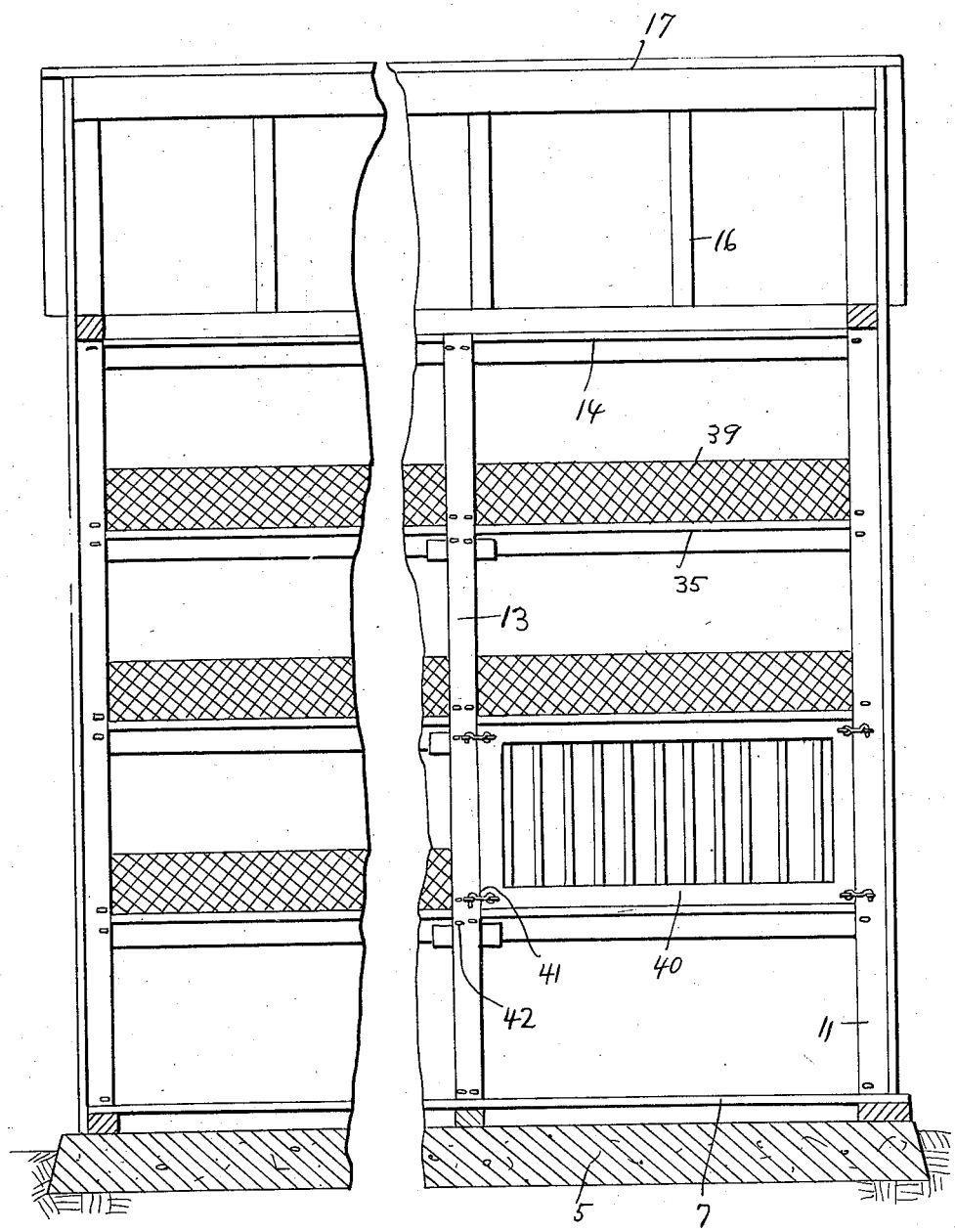
Figure 3 represents a vertical sectional view through the house taken on a plane at right angles to the sectional plane of Figure 1.
Figure 4:
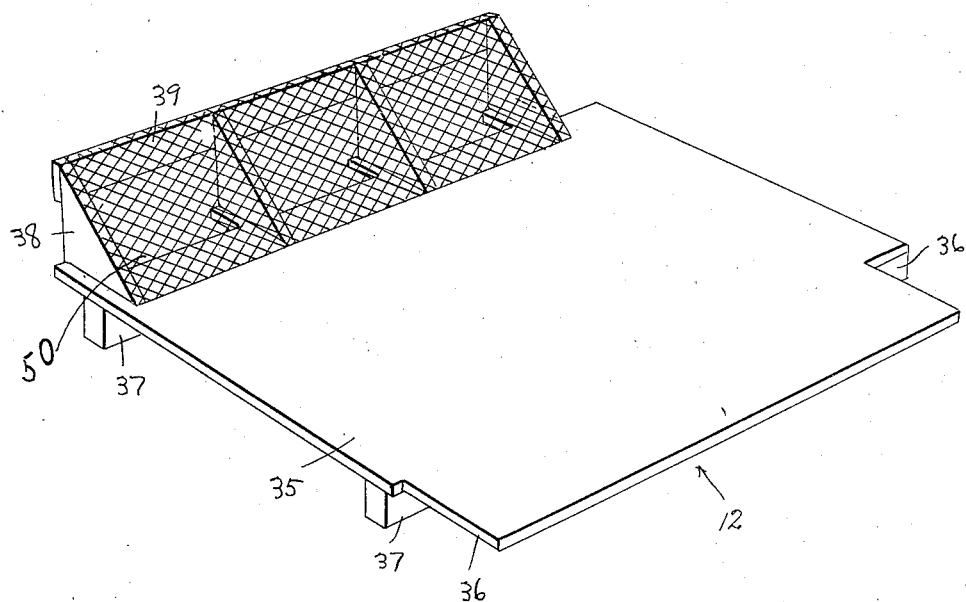
Figure 4 represents a perspective view of one of the removable floor units.

Referring to the drawings, wherein like units designate like parts, the improved brooding house is preferably built upon a suitable foundation 5 of concrete, and as shown in Figures 1 and 3, joists 6 are laid upon the foundation 5, for supporting the flooring 7. Corner posts 8 extend upwardly from the four corner portions of the foundation 5 (as shown in Figure 2) and are secured by suitable means to the joists 6.

As shown in Figure 2, end walls 9—9 and side walls 10—10 are secured to the corner posts by any suitable means and the side walls 10—10 are also secured each to a post 11 which serves to support the forward end of the floor unit, one of which is perspectively shown in Figure 1 and referred to by numeral 12. A center post 13 has its lower end secured to the flooring 7 and its upper end is secured to the cross member 14 bridging the horizontal upper frame 15 mounted upon the post 8. A roof frame 16 rises above the frame 15 and a covering 17 of suitable roofing material is secured over the frame 16.

Figure 5:
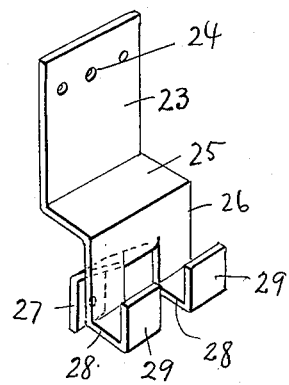
Figure 5 represents a perspective view of the means for supporting the rear end of the removable floor unit.

An opening 18 is provided in one side wall 10 for receiving a closure 19, while the opposite side wall 10 of the house is also provided with a relatively large opening 20 for receiving a hingedly mounted door 21, suitably equipped with knobs 22 and perhaps a suitable fastener. Secured to the end wall nearest the post 11—11 and to the post 11—11 are the brackets such as shown in Figure 5. This bracket consists of a plate 23 provided with openings 24 for receiving suitable fastening elements whereby the plate may be secured to the aforementioned parts of the house. The plate 23 has an outwardly disposed portion 25 and a depending portion 26 at the outer end of the portion 25. This depending portion 26 has a top struck longitudinally therefrom and bent backwardly and laterally as at 27 and apertured to receive fastening means whereby it may be secured to the same portion of the house as is the plate 23, to serve as a brace for the furcations 28—28 which have their ends bent upwardly as at 29 to provide hooks.

Figure 6:
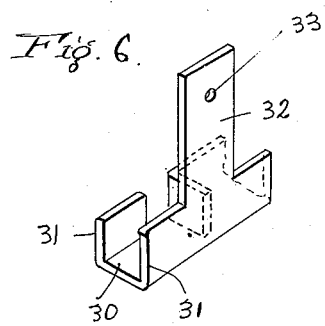
Figure 6 represents a perspective view of a bracket for supporting the forward ends of the floor unit.

Secured to the center post 13 at predetermined vertically spaced intervals are brackets as shown in Figure 6. This bracket includes a U-bar 30 having the side flanges 31—31, and a tongue 32, extending upwardly from the intermediacy of one of the flanges 31. This tongue is apertured as at 33, to receive securing means whereby the bracket may be secured to the center post 13 for supporting the forward end of the floor unit 12. The intermediacy of the opposite flange 31 is broken and a portion thereof bent inwardly to provide the partition 34. The four units hereinbefore mentioned each consists in construction of a substantially square board 35, with its forward end reduced at its corner portions 36. A cleat 37 is secured to the under side of the board adjacent each end thereof and the cleat 37 at the forward end portion of the board is adapted to engage upon the hook members of the bracket shown in Figure 5 at its outer end while its inner end engages upon one half portion of the U-shaped portion 30 of the bracket shown in Figure 6 and attached to the center post 13. The rear face 37 is supported by the U-member of the bracket shown in Figure 5, several of which are secured to the rear wall of the house. Mounted at the rear end of the board 35 are a plurality of upright triangular shaped pieces 38, arranged in equal spaced relation.

The rear edge portion of the respective floorings 35 are provided with inwardly disposed openings 50 to permit circulation of air through the various compartments of the house. In this manner the house will be thoroughly ventilated and the death of the chickens by reason of poor ventilation will be substantially reduced.

Secured to the hypotenuse side of these angular pieces 38 is a sheet of mesh material 39 to prevent the chickens from falling through the ventilating openings.

It will thus be seen that the present invention embodies numerous features of novelty, particularly in the removable floor unit. It will also be seen that the spaces between the post 11 and the center post 13 may be closed by gratings 40 detachably secured to the post by hook fasteners 41 engageable with the eye members 42 on the said post.

It is to be understood that various changes to the specific shape, size and materials may be resorted to, without departing from the spirit or scope of the invention as claimed hereinafter.

Furthermore, it is to be understood that the ventilating structure may be arranged at the side edges of each floor unit as well as the rear edge, leaving the front edge portion of the floor unit free and unobstructed so that feed may be placed thereon for the poultry. Obviously the poultry cannot be crowded or suffocated by reason of the presence of this extended ventilating structure, but of course the ventilating structure may be arranged in any manner seen fit by the proprietor of the house.

Having thus described my invention, what I claim as new is:

A poultry brooding house comprising side walls and a roof, posts located in the house spaced from one of the walls thereof, brackets connected to said wall and the posts and each bracket being formed with a hook part, with the hook portions of the brackets connected to the walls being spaced from said walls, a plurality of floor units having cleats on the bottom faces for engaging the hook portions of the brackets, each unit having openings in that end adjacent the wall and located between the extremity of the end and and the adjacent cleat, triangular shaped members connected to the upper face of the floor unit and between which the openings are located and wire mesh connected to the inclined edges of said members for covering the openings, said inclined edges sloping downwardly and forwardly away from the said wall.

In testimony whereof I affix my signature.

CHARLES J. KELLEY.